United States Patent Office 3,468,758
Patented Sept. 23, 1969

3,468,758
MEASLES VACCINE ATTENUATED THROUGH AVIAN CHORIO-ALLANTOIC MEMBRANE
Victor Jack Cabasso, Pearl River, N.Y., assignor to American Cyanamid Company, Stamford, Conn., a corporation of Maine
No Drawing. Filed Aug. 17, 1965, Ser. No. 480,482
Int. Cl. C12d 7/00; A61k 23/00
U.S. Cl. 195—1.3                                              4 Claims

ABSTRACT OF THE DISCLOSURE

Attenuated live measle virus, such as Edmonston strain, which has been adapted to grow in avian embryo tissue culture is grown for a number of passages on the chorio-allantoic membrane as fertilized egg in ovo, the passages being at a temperature between 35° and 38° C. until the virulence begins to disappear. Then the passages are continued at a lower temperature, 28° to 34° C., until a vaccine is produced which has the following characteristics: (1) the vaccine causes production of measles antibodies when inoculated into children, rashes do not result, and fever is rarer and lower than with the Edmonston strain; (2) when inoculated onto a chorio-allantoic membrane of a fertilized egg, it grows; (3) during growth it produces inflammatory and necrotic lesions on the membrane.

BACKGROUND OF THE INVENTION

The development of measles vaccines was made possible by Enders and his associates who propagated measles virus in human and simian kidney cultures, adapted the Edmonston strain of the virus to chicken embryos inoculated by way of the amniotic sac, and cultivated that strain in monolayers of chicken embryo cells, thereby making available measles vaccines incorporating either a live or inactivated measles virus.

Live-virus vaccines (Enders' vaccine) prepared from the Edmonston strain after 13 to 20 passages in cultures of chicken embryo tissue proved to be highly immunogenic when administered to measles-susceptible children. However, as many as 40 percent of these children reacted with temperatures of 103° F. or higher, and about 50 percent developed a rash. In attempts to eliminate or reduce these reactions, human gamma globulin was administered at the same time as the vaccine (Enders), or the vaccine virus was further attenuated by additional passages in cultures of chicken embryo tissue at various incubation temperatures (Schwarz). Both of these approaches to the problem significantly reduced the occurrence of reactions to measles vaccination, but did not entirely eliminate them. It has been demonstrated, that the administration of a vaccine containing the attenuated Schwarz strain of measles virus results in the same degree of reactivity as the administration of the Edmonston strain (Enders' vaccine) with the concurrent administration of gamma globulin.

SUMMARY OF THE INVENTION

The present invention represents the culmination of a long series of investigations conducted largely by the inventor and his associates in the problem of the reactivity of live measles virus vaccine, and the attempts to obviate same by attenuating the virus in a different way, namely by adapting the virus to the chorio-allantoic membrane of the avian embryo. Investigators, in particular Milovanovic, Enders, and Mitas, Pro. Soc. Exp. Biol. and Med. 95, 120–127 (1957), "Cultivation of Measles Virus in Human Amnion Cells and in Developing Chick Embryo," disclose that attempts to adapt measles virus on the chorio-allantoic membrane of developing chicken embryo were unsuccessful. The inventive concept upon which the present invention is based resides in the discovery that an attenuated live measles virus, which has been adapted to grow in avian embryo tissue culture, and which produces a high rate of febrile reaction and rash in children, can be further attenuated by first establishing the growth of said virus on the chorio-allantoic membrane of avian eggs in ovo at an incubation temperature of from about 35° C. to 38° C., then passing the established virus on the chorio-allantoic membrane of avian eggs in ovo at an incubation temperature of from about 28° C. to 35° C.

Therefore, the invention relates to a method for preparing a further attenuated live measles virus, which comprises introducing an attenuated live measles virus, which has been adapted to grow in avian embryo tissue culture, and which produces a high rate of febrile reaction and rash in children, onto the chorio-allantoic membrane of avian eggs in ovo, incubating said eggs at a temperature of from about 35° C. to about 38° C., for a period of time sufficient to promote growth of said virus, harvesting the virus so produced, introducing onto the chorio-allantoic membrane of avian eggs in ovo said harvested virus, incubating said eggs at a temperature of from about 35° C. to about 38° C., for a period of time sufficient to promote the growth of said virus, harvesting the virus so produced, and repeating the immediately preceding two steps for a sufficient number of passages until growth of the virus is fully established. The established virus is then harvested and introduced onto the chorio-allantoic membrane of avian eggs in ovo, said eggs are incubated at a temperature of from about 28° C. to about 35° C., for a period of time sufficient to promote growth of said virus, harvesting the virus so produced, introducing said harvested established virus onto the chorio-allantoic membrane of avian eggs in ovo, incubating said eggs at a temperature of from about 28° C. to about 35° C., for a period of time sufficient to promote growth of said established virus, harvesting the established virus so produced, and repeating the immediately preceding two steps for a sufficient number of passages to produce a further attenuated live measles virus, the antigenicity of which is sufficient to produce an immunogenic response.

According to the present invention, an attenuated live measles virus such as the Edmonston strain (Enders' vaccine) is introduced on the chorio-allantoic membrane of avian eggs in ovo and incubated at 35° C. to 38° C., the virus is serially passed and incubated at 35° C. to 38° C., for a sufficient number of passages to achieve an established growth of the virus at 35° C. to 38° C. The established virus is then introduced on the chorio-allantoic membrane of avian eggs in ovo and incubated at 28° C. to 35° C., for a sufficient number of passages to achieve further attenuation. Indicia of further attenuation is the appearance on the chorio-allantoic membrane of inflammatory and necrotic lesions, and as the passages continue at 28° C. to 35° C., the intensity of the inflammatory and necrotic lesions becomes more clearly apparent.

It should be noted, that attempts to pass the aforementioned measles virus, prior to the establishment of the growth of said virus, at temperatures less than 35° C., were for the most part unsuccessful, since the passages resulted in either reduced titers, or no virus could be detected on titration. Whereas, the titer of parallel passages at 35° C. to 38° C. were significantly higher. Furthermore, the continued passage of the aforementioned measles virus at incubation temperatures of 35° C. to 38° C., once the growth of said virus was established, resulted in substantially reduced titers. Lastly, once the growth of said virus was established and passage at incubation temperatures of 28° C. to 35° C. initiated, attempted passage at incubation temperatures of 35° C. to 38° C., were equally unsuccessful.

The number of initial passages necessary to establish the growth of the aforementioned measles virus may be as little as six or eight, or as high as ten to fourteen.

With regard to the incubation temperatures of the novel method of the present invention, the preferred incubation temperature to establish growth of the aforementioned measles virus is approximately 37° C. to 38° C.; whereas, once growth of said virus has been established an incubation temperature of approximately 34° C. is preferred.

The novel method of the present invention employs avian eggs in ovo, and it is preferred to use chicken eggs primarily as a consequence to their general availability throughout the year, as well as low cost. However, the eggs of other avian species such as turkeys, geese and the like may be used.

Further attenuation of the live measles virus having been achieved in the foregoing manner, the further attenuated live measles virus strain (Cabasso strain) can be maintained in avian embryo tissue culture to provide a seed, or the harvested last chorio-allantoic membrane passage may be used directly as a vaccine.

When the further attenuated virus has been cultivated one or more times in avian embryo tissue culture such as chicken, to obtain pools for vaccine preparation, the culture is incubated at a temperature of from about 28° C. to 37° C., until the virus has multiplied to produce a useful concentration thereof, and the fluid and cells from the tissue cultured vessels are harvested under aseptic conditions and clarified by centrifugation, filtration, or the like. The resulting vaccine material may be used directly as a vaccine, or depending on the contained concentration of virus, may be diluted with a suitable injectable diluent or stabilizing solution non-toxic to the virus to prepare a finished liquid vaccine. The latter is free of tissue cells and debris, and the virus content is standardized by titration as, for example, against human, or monkey tissue culture cells. Thereafter, if desired, the vaccine concentrate may be employed directly for vaccinations of non-immune humans, or may be diluted with a sterile stabilizer such as lactose, or lactose glutamate solution, and stored frozen at temperatures of −20 to −70° C. until used. Alternatively, the stabilized vaccine may be lyophilized to provide a dry vaccine product, which is easily storable and which may be reconstituted with sterile water or the like just prior to use.

The following examples are provided for illustrative purposes and may include particular features of the invention, however, the examples should not be construed as limiting the invention, many variations of which are possible without departing from the spirit or scope thereof:

DESCRIPTION OF THE PREFERRED EMBODIMENTS

Example I.—Establishment of the growth of an attenuated live measles virus

The present example demonstrates the establishment of the growth of the attenuated live measles virus on the chorio-allantoic membrane of avian eggs in ovo.

The Edmonston strain (Enders' vaccine) of attenuated live measles virus was used as a seed; said strain having been prepared by Enders from a virus isolated from a patient. The virus was serially passed for 24 passages through human kidney tissue, serially passed for an additional 28 successive passages in human amnion tissue, and then grown in chicken embryos, in the amniotic sac, for 6 passages. The virus was finally serially passed through 13 passages of chicken embryo tissue culture.

The above Edmonston strain (Enders' vaccine) of attenuated live measles virus was introduced onto the chorio-allantoic membrane of 8-day old embryos, obtained from a RIF-free flock of chickens developed at Lederle Laboratories, a Division of American Cyanamid Company, Pearl River, New York, from a commercial flock of chickens which was intensively tested for RIF. Inoculations were made at the base of an artificial air sac formed on the side of the egg. The inoculated eggs were incubated for 7 days at about 37° C. to 38° C., and on the seventh day were aseptically opened. The chorio-allantoic membranes were examined for macroscopic changes, pooled and used to prepare a 20 percent chorio-allantoic membrane suspension in sterile, distilled water containing 100 micrograms each, of streptomycin and neomycin. The infected chorio-allantoic membrane suspension was then introduced onto the chorio-allantoic membrane of 8-day old embryos from the RIF-free flock hereinabove identified. The inoculated eggs again being incubated at 37 to 38° C., for a sufficient time to promote growth of the virus. The serial passages were continued until the growth of the virus was established on the chorio-allantoic membrane. This point was ascertained by titrating a 20 percent suspension of each chorio-allantoic membrane passage in a cercopithecus monkey kidney cell culture. Establishment of the growth of the virus was accomplished during the course of 11 passages at 37 to 38° C. After the eleventh passage, a titer of $10^{2.5}$ TCID per ml. was harvested. Passages beyond the eleventh passage at 37 to 38° C. resulted in reduced or negative titers.

Example II.—Passage of the established virus

This example demonstrates the further passages of the established virus of Example I.

A 20 percent suspension of the infected chorio-allantoic membrane of the eleventh passage of the Example I was introduced onto the chorio-allantoic membrane of 8-day old embryos from the RIF-free flock hereinabove identified. The inoculated eggs were then incubated at 32 to 34° C. for a period of time sufficient to promote the growth of the virus. The virus was continually serially passed at 32 to 34° C. on the chorio-allantoic membrane with a resultant increase in titers, the harvested virus having a titer of approximately $10^{3.5}$ TCID per ml.

During the 11 passages at 37 to 38° C. and the first three passages at 32 to 34° C., no significant macroscopic changes were evident on the infected chorio-allantoic membrane, but by the fifteenth passage, small, transparent areas of swelling, gelatinous in appearance, could be seen; by the eighteenth passage, frank inflammatory and necrotic lesions were evident on infected portions on the chorio-allantoic membranes. These lesions, which became more pronounced with continued passage of the virus, appeared as large, thickened, opaque areas, more often in the form of a ring at the line of contact between shell membrane and chorio-allantoic membrane; smaller, discreet, plaque-like lesions appeared within and outside this ring. The serial passages at 32 to 34° C. were carried on to the thirtieth cumulative passage in chorio-allantoic membrane, that is including the 11 passages of Example I, and it was at this point that the titer had increased to $10^{4.5}$ TCID per ml. Passages, parallel to passages 11 through 30, were attempted with embryos incubated at 36 to 38° C. and for the most part resulted in reduction of titers.

Example III.—Utilization of the further attenuated live measles virus

This example demonstrates the utilization of the further attenuated live measles virus of the present invention in monkeys.

Six rhesus monkeys, which had previously shown to be susceptible to measles, were divided into two groups of three. The first group were inoculated intramuscularly with 0.5 cc. of chicken embryo tissue culture fluid, which had been previously inoculated with a 20 percent suspension of the infected chorio-allantoic membrane of the thirtieth passage of Example II. The inoculated monkeys were then placed together with the second group of monkeys, which constituted a control group, and were observed for a period of 51 days.

Both groups of monkeys remained normal for the 51 day period, the inoculated monkeys did not demonstrate any reactivity to the further attenuated live measles virus. On the thirty-fifth and fifty-first days, both groups of monkeys were tested for measles antibodies, and the inoculated monkeys of the first group were found to have developed high measles antibody levels; whereas, the second control group of monkeys were free of measles antibodies.

It can be reasonably concluded from the foregoing that the virus at the thirtieth passage on chorio-allantoic membrane was devoid of virulence, as well as being fully immunogenic. Lastly, it may be concluded that the further attenuated live measles virus was shown to have a high degree of safety, since the virus did not spread to the control group of monkeys.

Example IV.—Titer determination

This example demonstrates the means and method used in determining virus titers.

The titers were determined by utilizing cercopithecus monkey kidney cell tissue cultures, said cultures were grown in stationary tubes in a medium consisting of Earle's balanced salt solution, 0.1% lactalbumin and 2% horse serum and after 2 days were renewed with a medium consisting of Medium 199, without glutamine containing 1% horse serum. To titrate the virus in either a 20% suspension chorio-allantoic membrane or tissue culture fluid, ten-fold dilutions in Hank's balanced salt solution and each culture tube was inoculated with 0.1 ml. of a virus dilution. After 4 to 5 days of incubation at 37° C., the medium in the tubes was renewed. On the seventh day, end points were calculated as described in Reed, L. J., and Muneck, H., American Journal of Hygiene 27, 493 (1938).

Although the invention has been described and illustrated by reference to particular embodiments thereof, it will be understood that in its broadest aspects the invention is not limited to such embodiments, and that variations and substitution of such equivalents may be resorted to within the scope of the appended claims.

What is claimed is:
1. A method of preparing a measles vaccine, which comprises
  (a) inoculating onto the chorio-allantoic membrane of fertile avian eggs in ovo a partially attenuated live measles virus adapted to grow in avian embryo tissue culture and which produces a high rate of febrile reaction and rash when inoculated into children;
  (b) incubating the eggs at a temperature between 35° and 38° C. for a period of time sufficient to promote growth of the virus;
  (c) harvesting the virus so produced;
  (d) repeating step a, b, and c as serial passages;
  (e) stopping the serial passages at about the time when substantial loss of antigenicity begins;
  (f) inoculating virus from step e into the chorio-allantoic membrane of fertile avian eggs in ovo, incubating said egges at a temperature from 28° to about 34° C., harvesting and repeating in serial passages until a virus is produced which on growth on the chorio-allantoic membrane at temperatures between 32° and 34° C. causes inflammatory and necrotic lesions.

2. A method according to claim 1 in which the attenuated virus produced is grown in avian embryo tissue culture until it has multiplied to produce a useful concentration and harvesting the vaccine material thus produced in a relatively high concentration.

3. A method according to claim 1 in which the measles virus in step a is an Edmonston strain of live measles virus.

4. A method according to claim 3 in which the attenuated virus produced is grown in avian embryo tissue culture until it has multiplied to produced a useful concentration and harvesting the vaccine material thus produced in a relatively high concentration.

References Cited

UNITED STATES PATENTS 3,255,081   7/1966   Barski.
3,133,861   5/1964   Schwarz.

OTHER REFERENCES

Beveridge et al., The Cultivation of Viruses and Rickettsiae in the Chick Embryo, 1946, published by His Majesty's Stationery Office, London, page 3.

Warren, Advances in Virus Research, vol. 7, page 30, 1960.

Enders et al., The New England Journal of Medicine, vol. 263, No. 4, pages 153–159, July 28, 1960.

Goffe et al., British Medical Journal, Nov. 11, 1961, pages 1244–1246.

Milovanovic et al., Proceedings of the Society for Experimental Biology and Medicine, vol. 95, No. 1, pages 120–127, May 1957.

RICHARD L. HUFF, Primary Examiner

U.S. Cl. X.R.

424—89